United States Patent [19]

Tonomura et al.

[11] 4,417,277
[45] Nov. 22, 1983

[54] TELEVISION RECEIVERS

[75] Inventors: Kenichi Tonomura; Shigeru Kadokawa, both of Takasaki; Michinao Ohsawa, Matsumoto, all of Japan

[73] Assignees: Hitachi, Ltd.; Hitachi Microcomputer Engineering, Ltd., both of Tokyo, Japan

[21] Appl. No.: 297,566

[22] Filed: Aug. 31, 1981

[30] Foreign Application Priority Data

Aug. 29, 1980 [JP] Japan ................................ 55-118332

[51] Int. Cl.³ .............................................. H04N 5/52
[52] U.S. Cl. ...................................... 358/177; 358/167
[58] Field of Search ................. 358/167, 174, 176, 177

[56] References Cited

U.S. PATENT DOCUMENTS 3,582,551  6/1971  Krug .................................... 358/177
3,806,646  4/1974  Hofmann .
3,898,380  8/1975  Wilcox .
4,030,125  6/1977  Bedell et al. .
4,032,973  6/1977  Haynes .

FOREIGN PATENT DOCUMENTS 1121021  7/1968  United Kingdom .
1413423  12/1975  United Kingdom .

Primary Examiner—Richard Murray
Attorney, Agent, or Firm—Antonelli, Terry & Wands

[57] ABSTRACT

An output of a noise canceller which cancels a noise component from within a composite video signal is applied to an input of an AGC detector which generates an AGC voltage for controlling the gain of a video intermediate frequency amplifier. A circuit controlled by a pulse provided from a vertical oscillator, thereby to control the noise cancelling operation of the noise canceller associated with the operation of the AGC detector into an inoperative state in a vertical flyback time is arranged, so that the lockout phenomenon under various receiving conditions of the television receiver can be prevented.

8 Claims, 2 Drawing Figures

TELEVISION RECEIVERS

DISCLOSURE UNDER 37 CFR 1.56(a)

The following information which we are aware of are disclosed under 37 CFR 1.56(a):
(1) U.S. Pat. No. 4,209,805; June 24, 1980.
(2) U.S. Pat. No. 4,237,487; Dec. 2, 1980.

BACKGROUND OF THE INVENTION

This invention relates to a television receiver.

In a prior-art television receiver, in order to form video signals of fixed level which are not affected by the changes of an input field intensity, the gains of a video intermediate frequency amplifier stage and a radio frequency amplifier stage are controlled with an AGC voltage proportional to the peak value of a synchronizing signal. Since an AGC circuit for forming the AGC voltage responds also to noise exceeding a synchronizing signal level, a noise canceller is required.

In case of constructing the noise canceller so that signals exceeding a fixed detection level may be regarded as noise and may have their transmission inhibited or be cancelled, the synchronizing signal is also eliminated by the arrival of a wide noise including the synchronizing signal or by the channel switching from a broadcasting station of low field intensity to a broadcasting station of high field intensity. As a result, the AGC voltage lowers, and a lockout phenomenon which increases the gains of the video intermediate frequency amplifier stage and the radio frequency amplifier stage takes place.

To the end of preventing this lockout phenomenon from occurring, it has been proposed to employ as the noise detection level a voltage which is formed by subjecting a composite video signal to a level detection.

In this case, however, the detection level responds to the wide noise, and hence, there is the disadvantage that the latter half part of a noise pulse cannot be eliminated. Here, when a time constant for the level detection is made sufficiently great, the same lockout as in the noise cancelling based on the fixed level, as above described, occurs temporarily. Therefore, the time constant cannot be made very great.

In the noise detection based on the level detection voltage, accordingly, although the lockout phenomenon can be prevented, the operation of a synchronizing circuit is disturbed by the inoperative state of the noise canceller as described above and the AGC voltage is adversely affected by the noise.

Further, in the case where the noise canceller is to be contained in a monolithic semiconductor integrated circuit, it increases the number of external terminals and external components required to form with the external components a time constant circuit to be used for the level detection. On the other hand, when the time constant circuit is contained in the monolithic semiconductor integrated circuit, there occurs the problem that the density of integration lowers sharply on account of the presence of a capacitor of large capacitance in the circuit.

SUMMARY OF THE INVENTION

An object of this invention is to provide a television receiver equipped with a noise canceller which performs a reliable noise cancelling operation while preventing the lockout phenomenon.

According to the fundamental feature of this invention, a noise canceller has its operation controlled by a vertical oscillation pulse and is made inoperative during a vertical flyback time.

PREFERRED EMBODIMENT OF THE INVENTION

Hereunder, this invention will be described in detail in conjunction with an exemplary embodiment.

Figure 1:
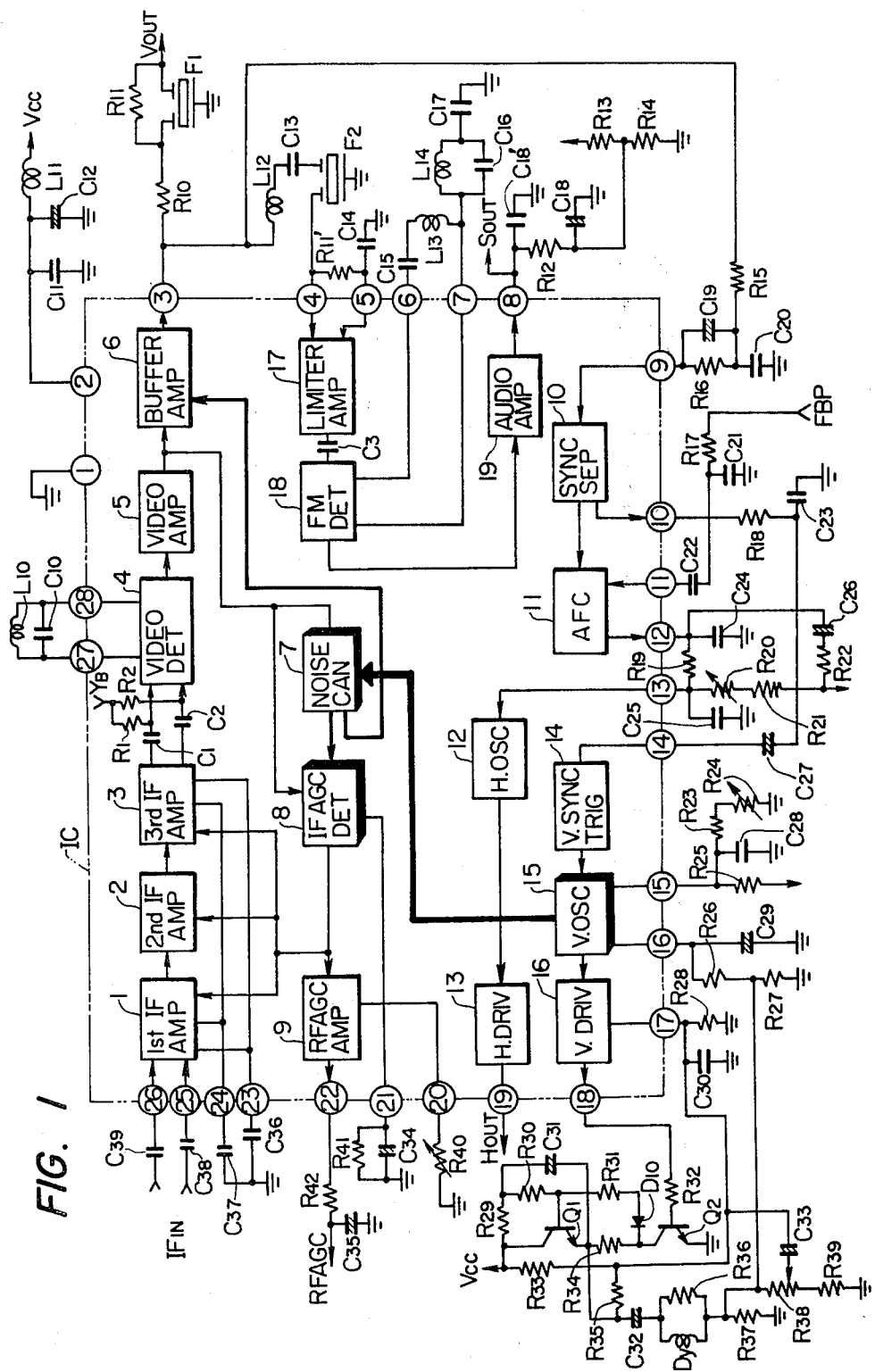
FIG. 1 is a block diagram of a television receiver according to an embodiment of this invention.

A part of a television receiver embodying this invention is shown as a simplified block diagram in FIG. 1. In the figure, circuit components enclosed with a dotted line are formed within a single semiconductor silicon chip by the well-known method of producing a monolithic semiconductor integrated circuit device, and numerals enclosed with circles indicate terminal Nos.

First, second and third video intermediate frequency amplifiers 1, 2 and 3, respectively, amplify a video intermediate frequency input signal $IF_{IN}$ applied across terminals Nos. 25 and 26. Capacitors $C_{36}$ and $C_{37}$ respectively connected to terminals Nos. 23 and 24 are disposed for a D.C. feedback circuit of the video intermediate frequency amplifiers 1–3.

An output signal from the video intermediate frequency amplifier stage is applied to a video detector 4 through a high-pass filter which is constructed of capacitors $C_1$ and $C_2$ and resistors $R_1$ and $R_2$. The high-pass filter at $C_1$, $C_2$, $R_1$ and $R_2$ is provided in order to eliminate an audio intermediate frequency signal of 4.5 MHz developing in the video intermediate frequency amplifier due to crosstalk through a power supply line from an audio circuit to be described later.

A coil $L_{10}$ and a capacitor $C_{10}$ each connected across terminals Nos. 27 and 28 form a tank circuit which is tuned to 59.75 MHz.

A video detection output signal from the circuit 4 is amplified by a video amplifier 5, and is delivered from terminal No. 3 through an output buffer amplifier 6 which serves also for noise cancelling. The terminal No. 3 is connected through a ceramic filter $F_1$ serving as a sound trap to any of various circuits at the succeeding stage, for example, a video amplifier stage or a band-pass amplifier in a color television receiver.

The output signal of the video amplifier 5 is also applied to a noise canceller 7 and an AGC detector 8. The noise canceller 7 executes a noise cancelling operation in such a way that a noise is detected on the basis of a fixed noise detection level and that an inverted noise signal is transmitted to the output buffer amplifier 6, thereby to cancel a noise component in the output video signal. As regards the AGC detector 8, the noise detection output is added to a synchronous pulse detection output which is inverted by the AGC detector, thereby to cancel a noise component included in the synchronous pulse detection output.

A capacitor $C_{34}$ and a resistor $R_{41}$ connected to terminal No. 21 form a time constant circuit for the AGC detection. An AGC voltage formed by the AGC detector 8 is used for gain control of the video intermediate frequency amplifiers 1–3. The AGC voltage is also applied to an AGC amplifier 9 for forming an AGC voltage for a radio frequency amplifier stage, which is delivered to the radio frequency amplifier stage from terminal No. 22. A variable resistor $R_{40}$ connected to terminal No. 20 is provided in order to adjust the starting level of the AGC operation of the radio frequency amplifier stage.

The composite video signal obtained from the terminal No. 3 is applied through terminal No. 9 to a synchronous signal separator 10, in which horizontal and vertical synchronous pulses are extracted. The resulting synchronous signal separation output is applied to an AFC circuit 11. The AFC circuit 11 detects the phase difference between the output pulse of the synchronous separator 10 and a flyback pulse FBP applied from terminal No. 11. The phase difference signal is smoothed by an integrating circuit connected to terminal No. 12, to form an AFC voltage, which is applied to a horizontal oscillator 12 through terminal No. 13 so as to bring the oscillation frequency of the horizontal oscillator 12 and the frequency of a horizontal synchronous signal into agreement. The resulting oscillation output is delivered from terminal No. 19 through a horizontal drive amplifier 13.

By applying the synchronous separation output signal delivered from terminal No. 10 to an integrating circuit, the vertical pulse is extracted and is applied through terminal No. 14 to a vertical synchronous trigger circuit 14, which controls the oscillation frequency of a vertical oscillator 15.

An output signal from the vertical oscillator 15 is applied to a vertical driving amplifier 16, the output of which is delivered through terminal No. 18 so as to drive a push-pull output circuit formed of transistors $Q_1$ and $Q_2$, etc. A part of an output signal from this vertical output circuit is fed back to the vertical oscillator 15 and the vertical driver 16 through terminals Nos. 16 and 17, respectively. A time constant circuit which constitutes the vertical oscillator is connected to terminal No. 15.

In this embodiment, the noise cancelling operation of the noise canceller 7 is rendered ineffective by the oscillation pulse of the vertical oscillator 15 during the vertical flyback time. The audio intermediate frequency signal from the terminal No. 3 is applied to terminals Nos. 4 and 5 through a ceramic filter $F_2$ which passes the audio intermediate frequency signal of 4.5 MHz to a limiter amplifier 17, the output of which is applied to an FM detector 18 through a coupling capacitor $C_3$. A phase shifter (tank circuit) which constitutes the FM detector is connected to terminals Nos. 6 and 7. An FM detection output from the FM detector 18 is amplified by an audio amplifier 19 and is delivered from terminal No. 8.

Figure 2:
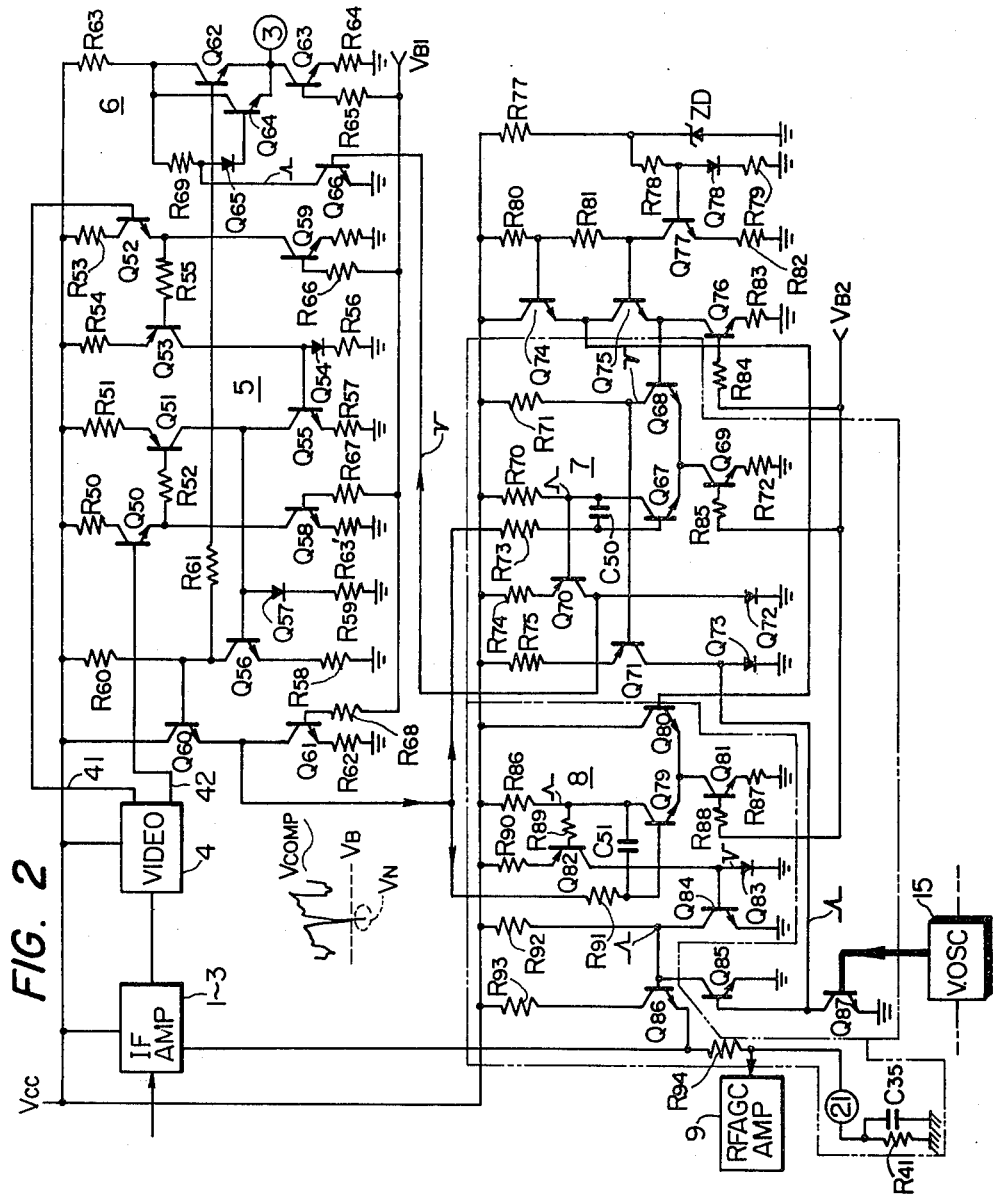
FIG. 2 is a circuit diagram showing essential portions in FIG. 1.

FIG. 2 is a more detailed circuit diagram showing the essential portions of the embodiment illustrated in FIG. 1. The video amplifier 5 has its inputs supplied with detection signals which are outputs on output lines 41 and 42 of the video detector 4 and which are opposite in phase to each other. More specifically, the detection output signals are applied to the bases of transistors $Q_{50}$ and $Q_{52}$ whose emitters have transistors $Q_{58}$ and $Q_{59}$, constituting constant current source circuits, connected thereto, respectively. The emitter output of the transistor $Q_{50}$ is applied to the base of a p-n-p transistor $Q_{51}$, while the emitter output of the transistor $Q_{52}$ is applied to the base of a p-n-p transistor $Q_{53}$. The collector output of the transistor $Q_{53}$ is applied to the collector of the transistor $Q_{51}$ through a current mirror circuit which is constructed of transistors $Q_{54}$ and $Q_{55}$ and resistors $R_{56}$ and $R_{57}$.

The composite video amplified signal as added at the collector of transistor $Q_{51}$ is amplified by a common-emitter type amplifier which is constructed of a transistor $Q_{56}$. The amplified output is, on one hand, applied to the base of a transistor $Q_{60}$ forming an emitter follower circuit, and is, on the other hand, transmitted to the output buffer circuit 6 through a resistor $R_{61}$.

The output buffer circuit 6 is formed of an emitter follower transistor $Q_{62}$, a transistor $Q_{63}$ which constitutes a constant current source and which is connected to the emitter of the transistor $Q_{62}$, a transistor $Q_{64}$ whose collector and emitter are respectively connected in common with those of the transistor $Q_{62}$, and series circuit formed by a resistor $R_{69}$ and a forward diode $Q_{65}$ connected between the base and collector of the transistor $Q_{64}$. A noise cancelling transistor $Q_{66}$ is disposed between the ground potential and the common juncture of the resistor $R_{69}$ and the diode $Q_{65}$.

The noise canceller 7 is constructed of differential transistors $Q_{67}$ and $Q_{68}$ for the noise detection, a transistor $Q_{69}$ which constitutes a constant current source circuit and which is connected to the common emitter of the transistors $Q_{67}$ and $Q_{68}$, and output transistors $Q_{70}$ and $Q_{71}$.

The base of one differential transistor $Q_{67}$ is connected to the emitter follower transistor $Q_{60}$ of the video amplifier 5 to receive the composite video signal whose audio intermediate frequency component has been removed by a high-pass filter constructed of a resistor $R_{73}$ and a capacitor $C_{50}$. The base of the other differential transistor $Q_{68}$ is supplied with a noise detecting reference voltage which is a constant voltage to be described later.

The inverted noise detection output signal provided from the transistor $Q_{67}$ of the noise canceller 7 is applied to the base of the transistor $Q_{70}$, the collector of which has a diode $Q_{72}$ connected thereto. This diode $Q_{72}$ constitutes a current mirror circuit along with the transistor $Q_{66}$. The non-inverted noise detection output signal provided from the transistor $Q_{68}$ is applied to the base of the transistor $Q_{71}$. A diode $Q_{73}$ and a transistor $Q_{85}$ which are connected to the collector of the transistor $Q_{71}$ construct a current mirror circuit, and are used for the noise cancelling of the AGC detector 8.

A constant voltage formed by a Zener diode ZD and a resistor $R_{77}$ is divided by a resistor $R_{78}$, a diode $Q_{78}$ and a resistor $R_{79}$, and then applied to the base of a constant current transistor $Q_{77}$. A constant current formed by this transistor $Q_{77}$ is caused to flow through resistors $R_{80}$ and $R_{81}$, whereby a constant voltage is formed.

A voltage drop across the resistor $R_{81}$ is applied to the base of a transistor $Q_{75}$, the emitter of which provides the noise detecting reference constant voltage for the noise canceller 7.

On the other hand, the AGC detector 8 is constructed of differential transistors $Q_{79}$ and $Q_{80}$ and a constant current transistor $Q_{81}$ similar to those of the noise detector, and an output transistor $Q_{82}$.

However, a detecting reference voltage for detecting the synchronous signal is set to be higher than the noise detecting reference voltage by the voltage drop across the resistor $R_{81}$. On the input side of the AGC detector 8, there are disposed a resistor $R_{91}$ and a capacitor $C_{51}$ which constitute a high-pass filter similar to the foregoing. The inverted synchronous signal provided from the collector of the transistor $Q_{79}$ is applied to the output transistor $Q_{82}$. A current mirror circuit constructed of transistors $Q_{83}$ and $Q_{84}$ is connected to the collector of the output transistor $Q_{82}$, whereby the synchronous signal is provided from the collector of the transistor $Q_{84}$. The collector output of the transistor $Q_{84}$ is subjected to level detection by the base and emitter of a transistor $Q_{86}$, a resistor $R_{94}$, and the time constant circuit connected to the terminal No. 21, so that the AGC voltage is formed.

The noise cancelling transistor $Q_{85}$ is disposed in parallel with the transistor $Q_{84}$ for obtaining the inverted synchronizing signal.

A transistor $Q_{87}$ which is controlled by the output pulse of the vertical oscillator 15 and which turns "on" in the vertical flyback time is incorporated between the base and emitter of the noise cancelling transistor $Q_{85}$.

In the operation of the circuit of this embodiment, on account of the composite video signal $V_{comp}$ of the negative polarity from the video amplifier 5, the AGC detector 8 will also respond to a negative voltage signal $V_N$ exceeding the noise detection voltage $V_B$. At this time, however, the transistor $Q_{85}$ turns "on," so that an inverted noise pulse going to become a high level is nullified.

In case of employing the fixed noise detection reference voltage in the prior art, the lockout phenomenon as described before arises. In this embodiment, however, the transisitor $Q_{87}$ turns "on" during the vertical flyback time and functions to turn "off" the noise cancelling transistor $Q_{85}$. Accordingly, even when the lockout has occurred temporarily due to, e.g., channel switching, the cessation of the noise cancelling operation in the vertical flyback time permits the formation of an AGC voltage proportional to the peak value level of the synchronous signal during the time. Therefore, the AGC voltage rises gradually, and the lockout phenomenon can be automatically released.

In the embodiment of this invention as stated above, features to be especially noted are as follows:

(1) The noise canceller 7 is completely contained in the monolithic semiconductor integrated circuit, and the time constant circuit for detecting the signal level as has heretofore been used is not arranged in this noise canceller 7.

(2) Since the time constant circuit for detecting the signal level is omitted from the noise canceller 7, the noise cancelling operation of the noise canceller 7 is executed with reference to the fixed detection level.

(3) Since the oscillation pulse of the vertical oscillator 15 is applied to the noise canceller 7, the noise cancelling operation of the noise canceller 7 is inhibited during the vertical flyback time.

Owing to the aforecited features, this invention makes it possible to prevent the lockout phenomenon and also to reduce the number of external terminals and external components of the monolithic semiconductor integrated circuit.

On the basis of the above, the lockout phenomenon can be prevented by the intermittent inoperative states of the noise canceller in only the vertical flyback times according to the fundamental feature of this invention, and the noise cancelling operation based on the fixed detection level can be performed, so the noise cancelling operation is reliable.

Owing to the reliable noise cancelling operation, synchronism disturbances etc. are not caused by wide pulses, and any substantial synchronism disturbance which is influential on the voice picture is not caused by noise occurring during the vertical flyback time. In the presence of noise in the vertical flyback time, the AGC voltage responds thereto, but the influence of the noise does not remain in the video signals which form an effective video picture on the basis of the AGC voltage after the end of the vertical flyback time and free from the noise.

Further, in the case where the noise canceller and the vertical oscillator are formed within the identical monolithic semiconductor integrated circuit as illustrated in the embodiment of FIG. 1, the time constant circuit for forming the noise detection level as stated before is dispensed with and both can be directly coupled with the integrated circuit, so that the numbers of the external terminals and the external components can be reduced or the lowering of the density of integration can be prevented.

This invention is not restricted to the foregoing embodiment, but can be variously modified. For example, the noise cancelling operation may well utilize an analog switch circuit which inhibits the transmission of the composite video signal. Various circuit blocks constituting the television receiver are usually constructed of monolithic semiconductor integrated circuits, and their combination can be variously modified. For example, the audio circuit 19 may well be constructed in another monolithic semiconductor integrated circuit. It is desirable, however, that the noise canceller and the vertical oscillator are constructed in the identical monolithic semiconductor integrated circuit as described above, to achieve the reduction of the external terminals.

The specific arrangements of the respective circuits can be variously modified, and any may be used as long as the operations as described above are carried out.

What is claimed is:

1. A television receiver comprising:
   (1) a video intermediate frequency amplifier for amplifying a video intermediate frequency signal;
   (2) a video detector which is connected to receive the output signal of said video intermediate frequency amplifier at its input and provide a composite video signal from its output;
   (3) noise canceller means for cancelling a noise component in said composite video signal;
   (4) an AGC detector which is connected to receive an output signal of said noise canceller at its input and provide from its output an AGC voltage for controlling the gain of said video intermediate frequency amplifier;
   (5) a vertical oscillator which is substantially controlled by a vertical synchronizing pulse in said composite video signal for producing an output pulse signal to control vertical deflection; and
   (6) means controlled by a pulse provided from said vertical oscillator for inhibiting the noise cancelling operation of said noise canceller means associated with the operation of said AGC detector during the vertical flyback time of vertical deflection.

2. A television receiver according to claim 1, wherein said noise canceller and a part of said vertical oscillator are formed within a single monolithic semiconductor integrated circuit.

3. A television receiver comprising:
   (1) a video frequency amplifier for amplifying a video frequency signal;
   (2) a video detector which is connected to receive the output signal of said video frequency amplifier at its input and provide a composite video signal from its output;

(3) noise canceller means for cancelling a noise component in said composite video signal, said noise canceller means including means for providing a fixed detecting reference voltage and means for comparing said composite video signal to said fixed detecting reference voltage to provide a noise cancelling output signal;

(4) an AGC detector for receiving an output signal of said noise canceller means at its input and providing from its output an AGC voltage for controlling the gain of said video frequency amplifier;

(5) a vertical oscillator which is substantially controlled by a vertical synchronizing pulse in said composite video signal for producing an output pulse signal to control vertical deflection of a display device in said receiver; and (6) means controlled by a pulse provided from said vertical oscillator for inhibiting the noise cancelling operation of said noise canceller means associated with the operation of said AGC detector during vertical flyback time of vertical deflection of the beam of the display device in said receiver.

4. A television receiver according to claim 3, wherein said noise canceller means and a part of said vertical oscillator are formed within a single monolithic semiconductor integrated circuit.

5. A television receiver comprising:
(1) a video frequency amplifier for amplifying a video frequency signal;

(2) a video detector which is connected to receive the output signal of said video frequency amplifier at its input and provide a composite video signal from its output;

(3) noise canceller means for cancelling a noise component in said composite video signal, said noise canceller means including means for providing a fixed detecting reference voltage and means for comparing said composite video signal to said fixed detecting reference voltage to provide a noise cancelling output signal;

(4) an AGC detector for receiving an output signal of said noise canceller means at its input and providing from its output an AGC voltage for controlling the gain of said video frequency amplifier;

(5) an oscillator which is substantially controlled by a synchronizing pulse in said composite video signal for producing an output pulse signal to control deflection of a beam in a display device in said receiver; and (6) means controlled by a pulse provided from said oscillator for inhibiting the noise cancelling operation of said noise canceller means associated with the operation of said AGC detector during flyback time of deflection of the beam of the display device in said receiver.

6. A television receiver according to claim 5, wherein said noise canceller means and a part of said oscillator are formed within a single monolithic semiconductor integrated circuit.

7. A television receiver comprising:
(1) a video intermediate frequency amplifier which amplifies a video intermediate frequency signal;

(2) a video detector which receives an output signal of said video intermediate frequency amplifier at its input and thereby provides a composite video signal from its output;

(3) a noise canceller which cancels noise in said composite video signal;

(4) an AGC detector which receives an output signal of said noise canceller at its input and thereby provides from its output an AGC voltage for controlling a gain of said video intermediate frequency amplifier;

(5) an oscillator which is substantially controlled by a synchronizing pulse in said composite video signal; and (6) means controlled by a pulse provided from said oscillator for controlling a noise cancelling operation of said noise canceller associated with an operation of said AGC detector into an inoperative state in a flyback time.

8. A television receiver according to claim 7, wherein said noise canceller and a part of said oscillator are formed within a single monolithic semiconductor integrated circuit.

* * * * *